(12) United States Patent
Nishioka

(10) Patent No.: US 11,723,467 B2
(45) Date of Patent: Aug. 15, 2023

(54) SEAT-TYPE ROCKING DEVICE

(71) Applicant: WIZAPPLY CO., LTD, Osaka (JP)

(72) Inventor: Yuhei Nishioka, Osaka (JP)

(73) Assignee: WIZAPPLY CO., LTD, Osaka (JP)

( * ) Notice: Subject to any disclaimer, the term of this patent is extended or adjusted under 35 U.S.C. 154(b) by 0 days.

(21) Appl. No.: 17/634,998

(22) PCT Filed: Oct. 9, 2020

(86) PCT No.: PCT/JP2020/038394
§ 371 (c)(1),
(2) Date: Feb. 14, 2022

(87) PCT Pub. No.: WO2021/079760
PCT Pub. Date: Apr. 29, 2021

(65) Prior Publication Data
US 2022/0273100 A1 Sep. 1, 2022

(30) Foreign Application Priority Data
Oct. 25, 2019 (JP) ................. 2019-194369

(51) Int. Cl.
*A47C 3/025* (2006.01)
*A63G 31/14* (2006.01)
*G09B 9/12* (2006.01)

(52) U.S. Cl.
CPC ............ *A47C 3/0251* (2018.08); *A63G 31/14* (2013.01); *G09B 9/12* (2013.01)

(58) Field of Classification Search
CPC ....... A47C 3/0251; A47C 7/021; A47C 3/026; A63G 31/14; A63G 13/00; A63G 31/02; G09B 9/12; G06F 3/01
(Continued)

(56) References Cited

U.S. PATENT DOCUMENTS 2,360,882 A * 10/1944 Marsh ................. G09B 9/12
 434/57
4,584,896 A * 4/1986 Letovsky ................. B25J 9/04
 434/57

(Continued)

FOREIGN PATENT DOCUMENTS

| JP | 2587027 B | 3/1997 |
|---|---|---|
| JP | 3795838 B | 7/2006 |
| KR | 10-1008410 B | 1/2011 |

OTHER PUBLICATIONS 4 page PDF of English translation of the written opinion dated Nov. 17, 2020 for PCT/JP2020/038394. (Year: 2020).*

(Continued)

*Primary Examiner* — Robert Canfield
(74) *Attorney, Agent, or Firm* — Yokoi & Co., U.S.A.; Toshiyuki Yokoi

(57) ABSTRACT

A strut member is connected to the center of a top plate portion which supports a seat portion and the center of a base portion so that the strut member rockably supports the top plate portion. A pair of rocking mechanisms formed by motors and link mechanisms connected to the output shafts of the motors and the top plate portion, and configured to be vertically displaced in accordance with a rotation of the motors is arranged in a front area or a rear area compared to the strut member in the base portion. The axial direction of the motor of one of the rocking mechanisms is aligned with a left oblique direction from the center of the supporting surface, and the axial direction of the motor of the other of the rocking mechanisms is aligned with a right oblique direction from the center of the supporting surface.

3 Claims, 13 Drawing Sheets

(58) Field of Classification Search
USPC .................................. 297/260.2; 434/37, 55
See application file for complete search history.

(56) References Cited

U.S. PATENT DOCUMENTS

| | | | | |
|---|---|---|---|---|
| 5,366,375 | A * | 11/1994 | Sarnicola | G09B 9/12 434/37 |
| 8,298,845 | B2 * | 10/2012 | Childress | A63G 31/02 438/46 |
| 8,403,673 | B2 * | 3/2013 | Atluri | G09B 9/14 434/55 |
| 8,568,343 | B2 * | 10/2013 | Fuster | A63B 21/4047 601/87 |
| 9,280,918 | B2 * | 3/2016 | Martinez | G01M 7/027 |
| 10,066,714 | B2 * | 9/2018 | Choi | A63G 31/16 |
| 2002/0055086 | A1 * | 5/2002 | Hodgetts | G09B 9/12 434/37 |
| 2012/0267504 | A1 * | 10/2012 | Atluri | G09B 9/12 248/419 |
| 2014/0290400 | A1 * | 10/2014 | Choi | A63G 31/16 74/25 |
| 2022/0020285 | A1 * | 1/2022 | Lookeren Campagne | A63G 31/02 |
| 2023/0061598 | A1 * | 3/2023 | Weinberg | A63F 13/90 |

OTHER PUBLICATIONS

International Search Report for PCT/JP2020/038394 dated Nov. 17, 2020.

* cited by examiner

SEAT-TYPE ROCKING DEVICE

TECHNICAL FIELD

The present invention relates to a seat-type rocking (swinging) device formed by arranging a mechanism for rockably supporting a seat portion on which a user is seated under the seat portion.

BACKGROUND ART

As a conventional seat-type rocking device, it is known that a chair-type device including: a plate-shaped installation base installed on a floor, a movable base for supporting a seat portion; a strut member which connects the movable base with the installation base at the center of each of them and supports the movable base so that the movable base is rockable around a pitch axis and a roll axis; a pair of electric actuators including servo motors and ball screws and the like, wherein the movable base is rocked by the extension of the ball screw of each of the actuators (Patent document 1). Furthermore, in the above described device, a plurality of elastic members is inserted between the movable base and the installation base for reducing the load on the actuator against the moment increased in accordance with the rocking motion of the movable base.

In addition, it is also known as a device for rocking a cockpit including a display and a seat wherein the device including: a rocking table for supporting the cockpit; a strut member which supports the rocking table so that the rocking table is rockable around a pitch axis and a roll axis; a pair of motors provided on both sides of the strut member; and link mechanisms (including crank arms, operation rods and the like) connected to an output shaft of each of the motors and the rocking table (Patent document 2). In the above described device, the rotation angle of each of rocking axes is measured by individual angle sensor and the measured values are fed back to a control circuit to control the rotation amount of the motors.

PRIOR ART DOCUMENTS

Patent Documents

[Patent document 1] Japanese Patent No. 3795838
[Patent document 2] Japanese Patent No. 2587027

DISCLOSURE OF THE INVENTION

Problems to be Solved by the Invention

In recent years, small-sized home-use game devices and game software for smartphones have been spread. Although body feeling games such as virtual reality games and racing games could be conventionally provided only as business-use game machines, home-use software for such games have been recently developed. A small-sized home-use device is also required as for a rocking device for playing the above described games.

In the rocking device described in Patent document 1, since the axial direction of the motor and the ball screw is aligned with the vertical direction, the height should be high and it is difficult to apply the rocking device to the forms other than the chair-type device.

In the rocking device described in Patent document 2, since each of the motors is arranged in a horizontal state, there is a possibility capable of modifying the height and the size of the device smaller by replacing the cockpit with a normal seat portion and reducing a size of the motors. However, in the above described device, each of the motors is arranged in the area around the strut member as a center so that the axial direction of each of the motors is aligned with the direction in parallel with a width center line of the area. Thus, each of the link mechanisms supports the rocking table at the position near the width center and the support of the rocking table is unstable at both end portions (shown in FIG. 2 and FIG. 3 of Patent document 2). In addition, if the interval between the link mechanisms is small, the rocking table is largely inclined even when the heights of the link mechanisms are slightly different from each other. Thus, it is difficult to control the rocking width in the left-right direction. From the viewpoint of the safety, it is difficult to generate a large rocking motion.

The present invention is made for focusing the above described problems and aims for providing a seat-type rocking device having a size and a shape suitable for using at home and stably supporting the seat portion and a user seated on the seat portion while allowing the user to feel sufficient rocking motion.

Means for Solving the Problem

A seat-type rocking device of the present invention includes: a top plate portion for supporting a seat portion; a base portion having a supporting surface which faces the top plate portion; a strut member which is connected to the center of the base portion and the center of the top plate portion so that the strut member rockably supports the top plate portion; and a pair of rocking mechanisms for rocking the top plate portion.

Each of the pair of rocking mechanisms includes: a motor which is rotatable in both forward and reverse directions; and a link mechanism which is arranged between an output shaft of the motor and the top plate portion, connected to both of the output shaft and the top plate portion, and configured to be vertically displaced in accordance with a rotation of the motor.

The motor of each of the pair of rocking mechanisms is arranged in a front area or a rear area compared to the strut member in the supporting surface of the base portion so that a connection portion between the motor and the link mechanism is directed toward a peripheral edge of the base portion. In addition, the axial direction of the motor of one of the pair of rocking mechanisms is aligned with a left oblique direction from the center of the supporting surface, and the axial direction of the motor of the other of the pair of rocking mechanisms is aligned with a right oblique direction from the center of the supporting surface.

According to the above described configuration, the link mechanisms are vertically moved while supporting the top plate portion by the strut member located at the center and two link mechanisms arranged respectively at the left oblique position and the right oblique position viewed from the center. Because of this, the top plate portion can be rocked in the front-back direction (around the pitch axis) and in the left-right direction (around the roll axis). Since the motor of each of the rocking mechanisms is arranged so that the tip of the output shaft is directed frontward or rearward of the base portion and the distance between the motors is increased as separating from the strut member, the distance between the link mechanisms connected with the output shafts of the motors can be extended sufficiently. Consequently, the top plate portion can be stably supported and the degree of the rocking motion of the top plate portion can be easily adjusted.

When the surface of the top plate portion has a nearly square shape or a nearly circular shape, the link mechanisms can be arranged near the left and right peripheral edges of the front part or the rear part of the top plate portion by aligning the axial direction of each motor with the direction inclined approximately 45 degrees with respect to the width center line of the supporting surface of the base portion. Thus, the top plate portion can be more stably supported.

Furthermore, since the motors are arranged so that the distance between the motors are increased as separating from the center, enough space can be formed at the front, rear, left and right of the strut member. Thus, an elastic member connecting the top plate portion with the base portion can be arranged on the above described space. Consequently, the top plate portion can be more stably supported. In addition, the load of the motor can be reduced by a restoring force of the elastic member deformed by the rocking motion of the top plate portion.

Furthermore, in the present invention, measuring units are provided at two positions on extension lines of axes of the motors respectively in the rear area or the front area compared to the strut member in the base portion. The motors are not arranged in the area. Each of the measuring units measures a displacement of the top plate portion caused by the rotation of the motor corresponding to the measuring unit. Thus, a rotation range of each of the motors can be preliminarily determined and each of the motors can be rotated so that the measurement values measured by the measuring units are within the preliminarily determined rotation range. By using the above described configuration, the range of the inclination of the top plate portion can be uniformed between left and right. Thus, the accuracy of the rocking motion can be secured.

Effects of the Invention

In the present invention, the top plate portion is supported by three positions: the center; the left oblique position from the center; and the right oblique direction from the center, and the force for generating the rocking motion is applied on two positions other than the center. Thus, the degree of the rocking motion can be finely adjusted while the top plate portion is supported stably. Accordingly, when the size of the seat portion is specified suitably for one person sitting on it and the size of the surfaces of the top plate portion and the base portion is specified to fit to the seat portion, a small-sized seat-type rocking device supporting the seat portion and a user seated on the seat portion stably while allowing the user to feel sufficient rocking motion can be provided.

MODES FOR CARRYING OUT THE INVENTION

Figure 1:
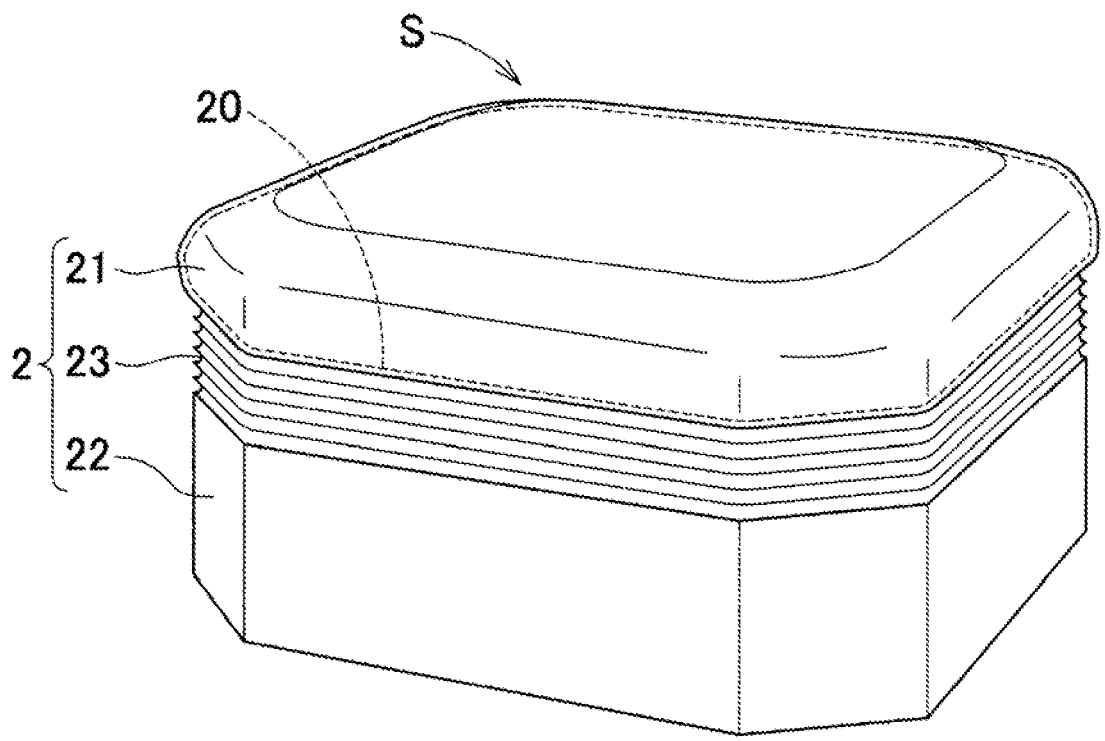
FIG. 1 is a perspective view showing an outer appearance of a seat-type rocking device corresponding to an embodiment of the present invention.

FIG. 1 is a perspective view showing an outer appearance of a seat-type rocking device S (hereafter, referred to merely as "rocking device 5") concerning an embodiment of the present invention. The rocking device S is comprised of: a body portion 1 shown in FIGS. 2 to 7; a cushion 20 placed on the body portion 1; and a cover body 2 covering the cushion 20 and the body portion 1.

The cover body 2 is formed by integrating: a lower member 22 surrounding from a bottom end of the body portion 1 to a range hiding later described motors $M_A$, $M_B$; an upper member 21 forming a seat portion of the rocking device S together with the cushion 20; and a bellows-shaped intermediate member 23 connecting the lower member 22 with the upper member 21. The lower member 22 is formed of hard resin. The upper member 21 and the intermediate member 23 are formed of soft resin. The intermediate member 23 supports the upper member 21 while the intermediate member 23 is deformed in accordance with the rocking motion of a top plate portion 10 of the body portion 1. Consequently, the rocking motion can be generated at the upper member 21 same as the top plate portion 10.

The rocking device S of the present embodiment is designed for moving in conjunction with a game device executing game programs for allowing a user to feel a rocking motion according to a progress of the game in body feeling games such as virtual reality games and racing games. Note that the rocking device S can also generate the rocking motion suitable for the motion shown by the image of the movie or the like in conjunction with an image reproduction device without being limited to the game. In addition, the rocking device S can be also used as a device for fitness.

Figure 2:
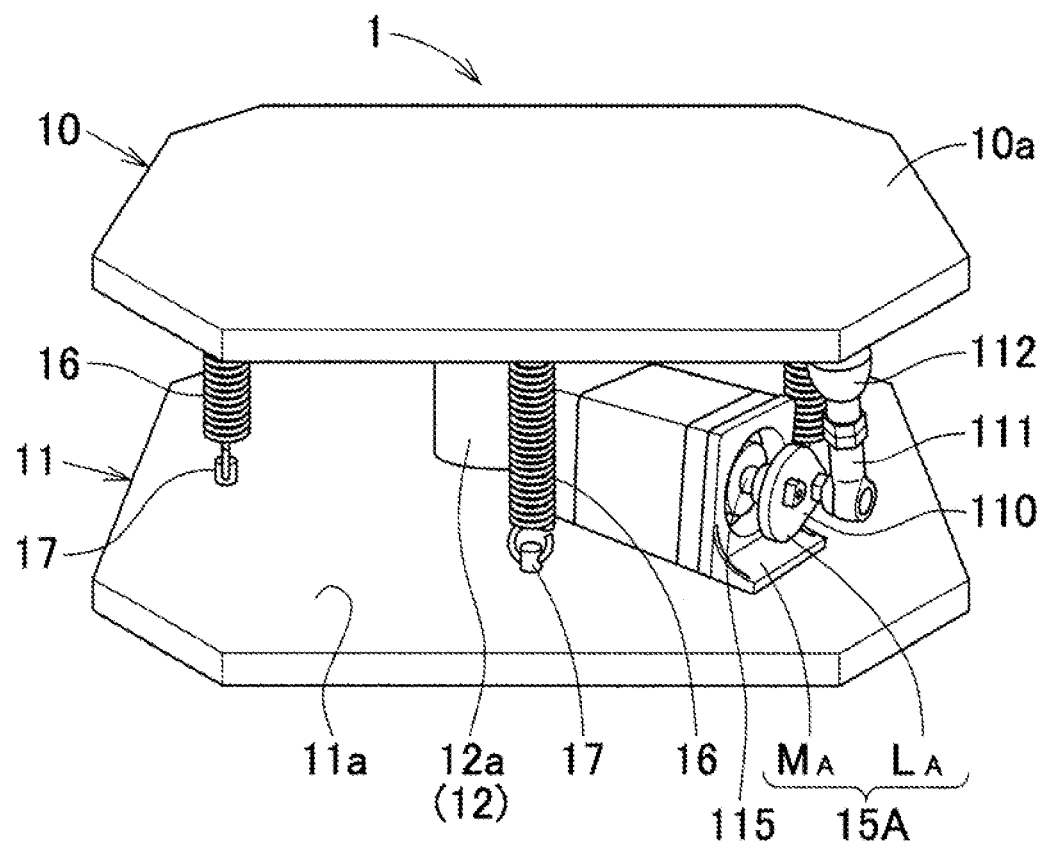
FIG. 2 is a perspective view showing a configuration of a body portion of the rocking device.
Figure 3:
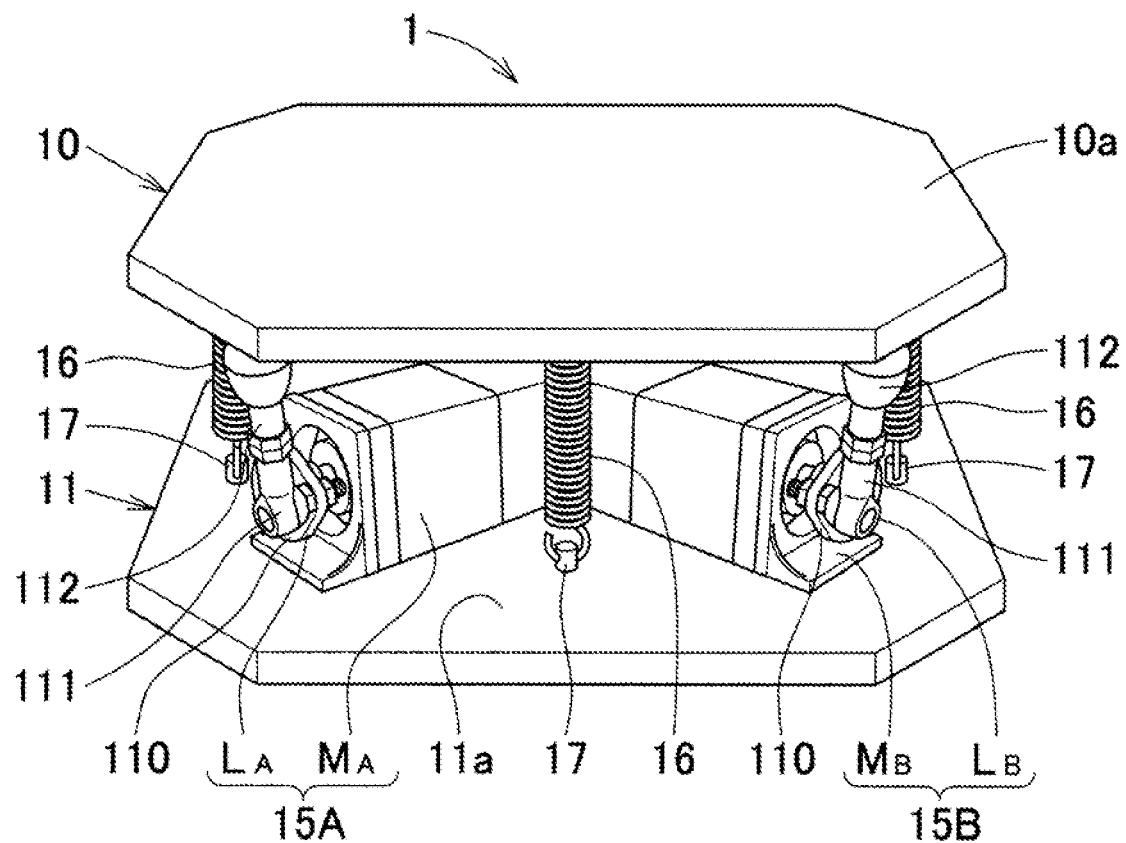
FIG. 3 is a perspective view showing a configuration of the body portion viewed from a rear side.
Figure 4:
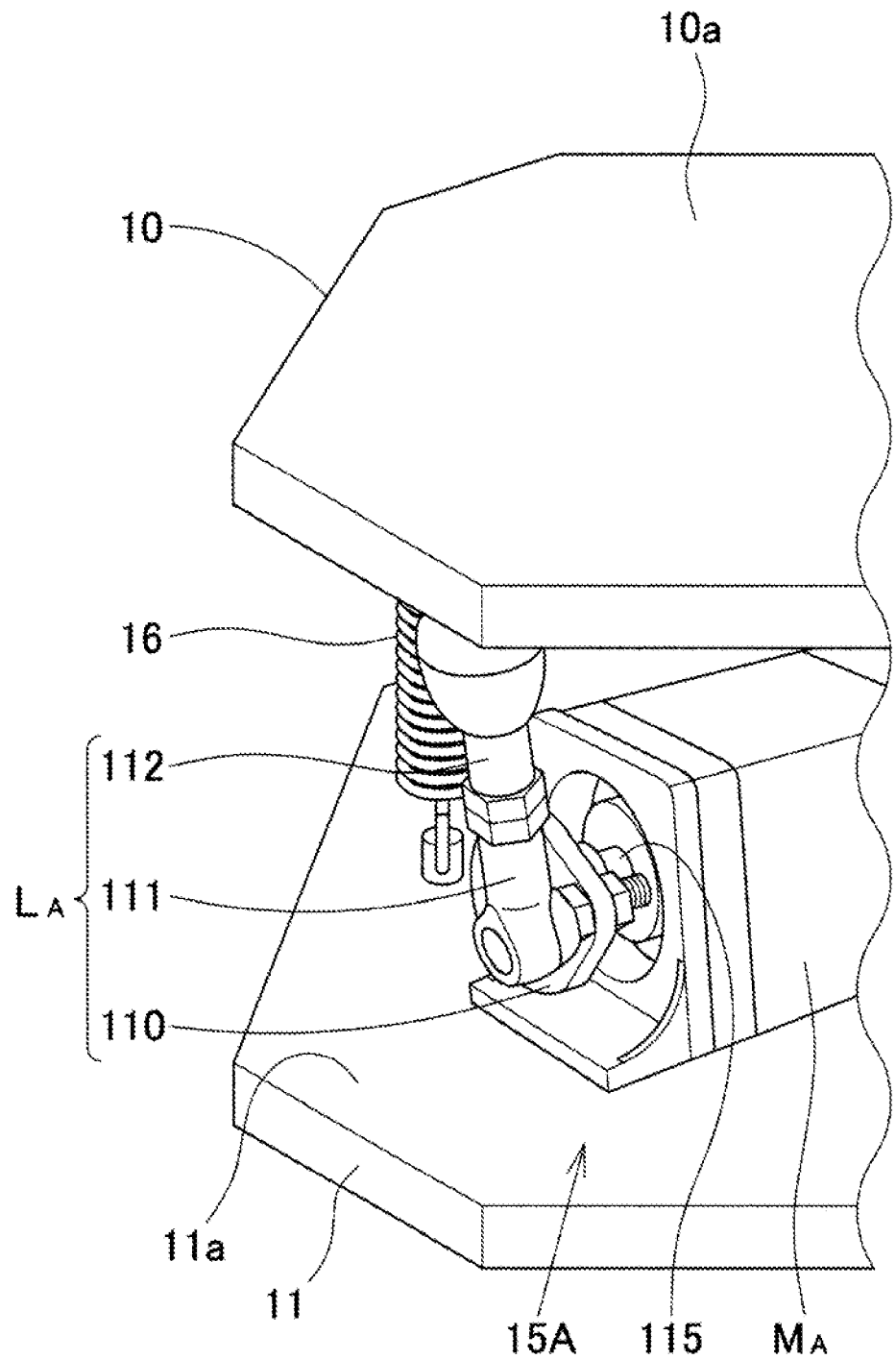
FIG. 4 is an enlarged perspective view of a part of FIG. 3.
Figure 5:
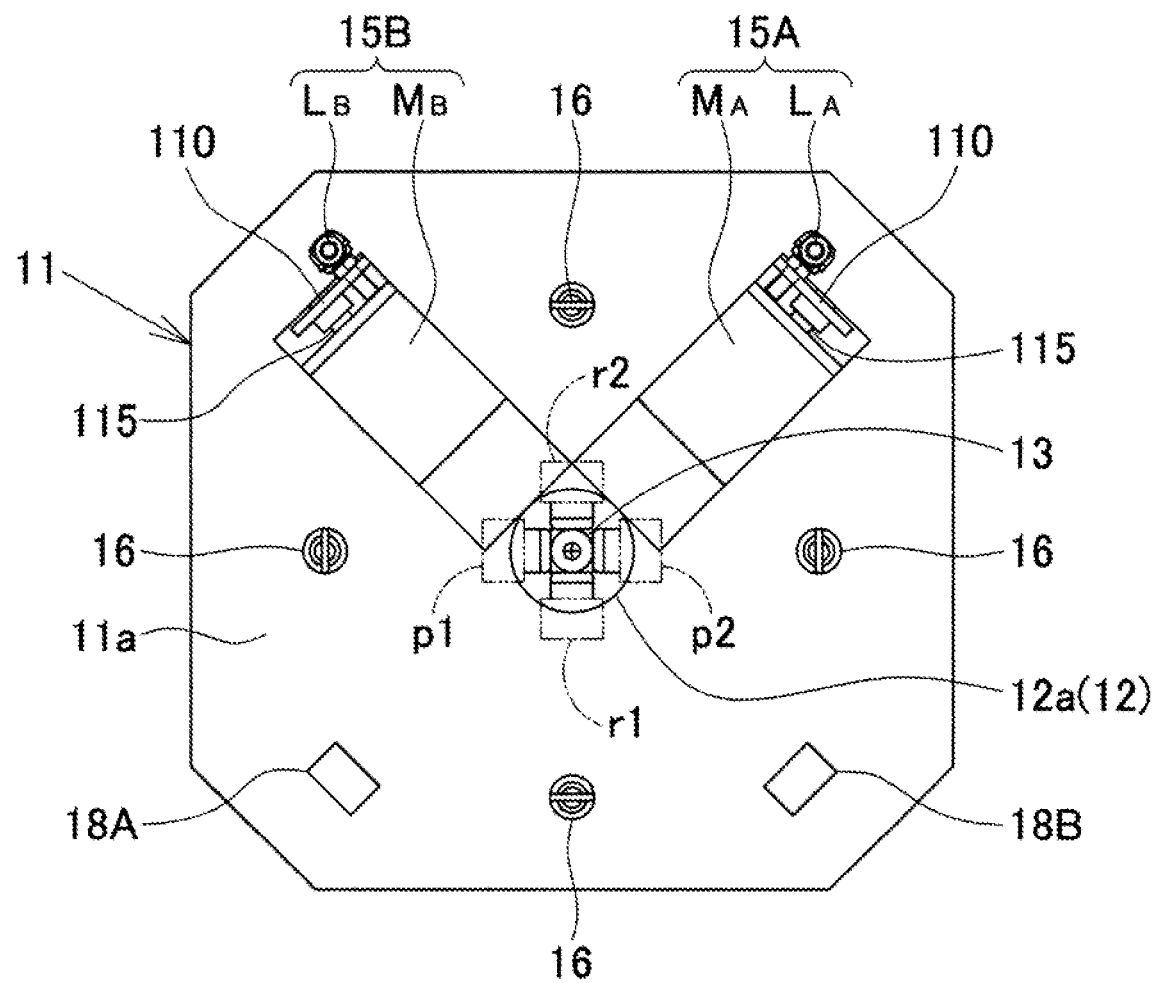
FIG. 5 is a plan view showing a configuration of a base portion and configurations arranged on a supporting surface of the base portion.
Figure 6:
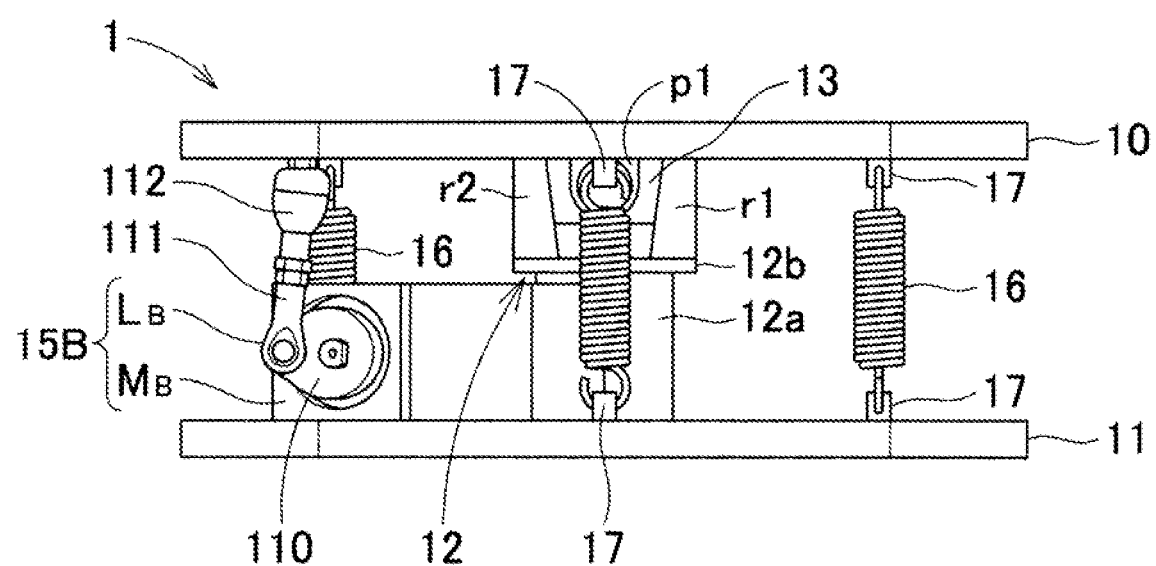
FIG. 6 is a left side view of the body portion.
Figure 7:
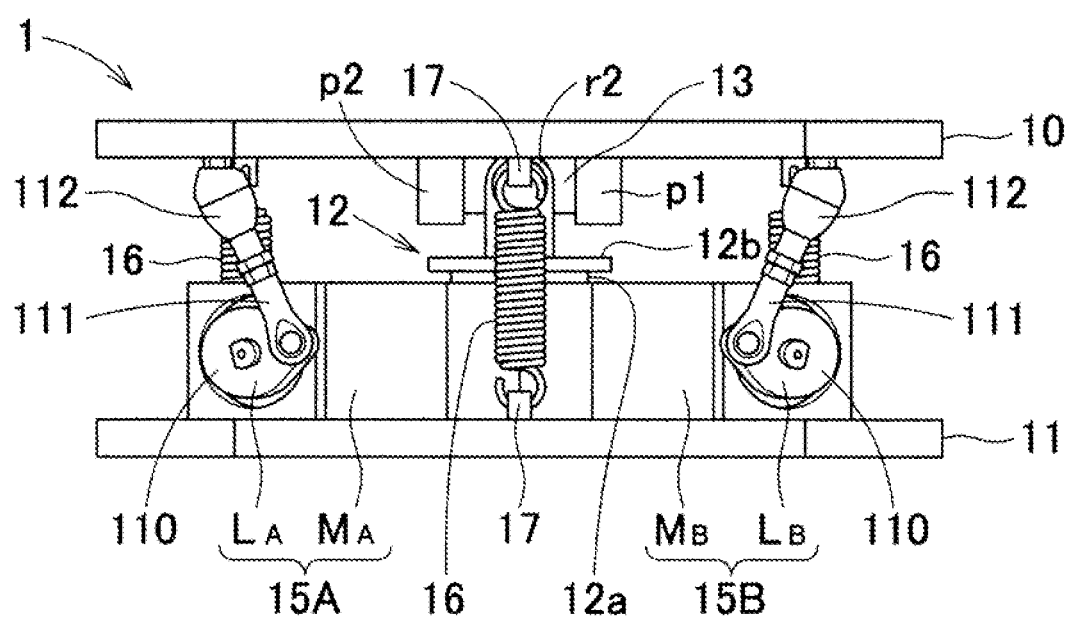
FIG. 7 is a rear view of the body portion.

FIG. 2 is a perspective of the body portion 1 viewed from the right side of the front. FIG. 3 is a perspective view of the body portion 1 viewed from the rear side. FIG. 4 is an enlarged perspective view of a part (part including a rocking mechanism 15A) of the left side of FIG. 3. FIG. 5 is a plan view (excluding the top plate portion 10) showing the configurations arranged on the base portion 11 of the body portion 1. FIG. 6 is a left side view of the body portion 1. FIG. 7 is a rear view of the body portion 1. Hereafter, the configuration of the body portion 1 will be explained in detail with reference to these drawings.

The body portion 1 of the rocking device S of the present embodiment is comprised of: a top plate portion 10 having a top surface 10a having an area suitable for placing the cushion 20 on it; a base portion 11 having a supporting surface 11a having the same shape and size as the top surface 10a; a strut member 12 connected to the center of the top plate portion 10 and the center of the base portion 11 for connecting them with each other; a pair of rocking mechanisms 15A, 15B; a control device 100 (shown in FIG. 8) for controlling the operation of the rocking mechanisms 15A, 15B and the like.

The top plate portion 10 and the base portion 11 are plate-shaped members having a surface of a (octagonal) shape formed by cutting four corners of a rectangular shape. (Although the width in the left-right direction is slightly longer than the depth in the present embodiment, the width and the depth can be same length.) The strut member 12 is comprised of: a cylindrical strut body 12a (shown in FIG. 2 and FIG. 5); a disk portion 12b (shown in FIG. 6 and FIG. 7) continuously formed from an upper end of the strut body 12a; a connecting rod (not illustrated) connected to the disk portion 12b; a universal joint 13 attached to an upper end surface of the connecting rod; and the like. A bottom portion of the strut body 12a is fixed to the base portion 11 by bolts or the like.

A pair of support members r1, r2 is connected to an upper surface of the disk portion 12b of the strut member 12 for supporting one of the axes of the universal joint 13 so as to be aligned with a center line along the front-rear direction of the top plate portion 10. The support members r1, r2 have a height reaching the top plate portion 10. The upper end surface contacting the top plate portion 10 has a curved surface in convex shape (shown in FIG. 7).

A pair of support members p1, p2 is connected to a reverse surface of the top plate portion 10 for supporting the other of the axes of the universal joint 13 so as to be aligned with a center line along the left-right direction of the top plate portion 10. The length of the support members p1, p2 is specified so that enough distance is formed between the support members p1, p2 and the disk portion 12b. The top plate portion 10 is connected to the universal joint 13 via the support members p1, p2 and supported by the upper end surfaces of the support members r1, r2. Consequently, the top plate portion 10 is supported so as to be rockable in the front-rear direction and in the left-right direction.

The rocking mechanism 15A is comprised of: a motor $M_A$; and a link mechanism $L_A$ arranged between an output shaft 115 of the motor $M_A$ and the top plate portion 10 and connected to both of the output shaft 115 and the top plate portion 10. The rocking mechanism 15B is also comprised of: a motor $M_B$ and a link mechanism $L_B$ which have the same configurations as the rocking mechanism 15A.

In the present embodiment, DC brushless motors are used for the motors $M_A$, $M_B$ considering the responsiveness to an instruction for switching a rotation direction. However, stepping motors can be also used instead of the DC brushless motors.

Each of the motors $M_A$, $M_B$ is fixed to the supporting surface 11a of the base portion 11 so that the rear surface of the motors $M_A$, $M_B$ is in contact with an outer peripheral surface of the strut body 12a and each axis of the motors $M_A$, $M_B$ is horizontal and directed obliquely rearward. This will be explained more in detail with reference to a plan view of FIG. 5. The axis of the motor $M_A$, which is located right-hand side viewed from the front, is aligned with the direction rotated clockwise by 45 degrees with respect to the width center line of the supporting surface 11a. The axis of the motor $M_B$, which is located left-hand side viewed from the front, is aligned with the direction rotated counterclockwise by 45 degrees with respect to the width center line of the supporting surface 11a.

Each of the link mechanisms $L_A$, $L_B$ is comprised of: a plate cam 110 connected to a tip end portion of the output shaft 115 of the corresponding motor ($M_A$ or $M_B$); a first arm 111 connected to the plate cam 110; a second arm 112 connected to the first arm 111 and the bottom surface of the top plate portion 10; and the like (shown in FIGS. 2, 3 and 4). Since the motors $M_A$, $M_B$ are arranged as described above, the link mechanisms $L_A$, $L_B$ are positioned respectively at the positions facing the left and right corner portions (notched portions) of the rear end portions of the base portion 11 and the top plate portion 10 and vertically displaced in accordance with the rotation of the motors $M_A$, $M_B$ connected to them (shown in the later described FIGS. 10 and 11).

In the present embodiment, for controlling the rotation motion of each of the motors $M_A$, $M_B$, a reference position of each of the motors $M_A$, $M_B$ is set by using the rotation positions of the motors $M_A$, $M_B$ when the connection position between the plate cam 110 of each of the link mechanisms $L_A$, $L_B$ and the first arm 111 is faced the width center of the device and located at the center in the height direction (shown in FIGS. 3 and 7).

The top plate portion 10 and the base portion 11 are connected by the strut member 12, and they are also connected via tension springs 16 (hereafter, referred to merely as "springs 16" in some cases) at four positions. The four positions are located near center lines along the front, rear, left and right directions respectively, and are equally distanced from the strut member 12. A connector 17 having a hole is provided at each of the four positions of the top plate portion 10 and the base portion 11. Both end portions of each of the springs 16 are inserted into the holes of the connector 17. Thus, each of the springs 16 is arranged vertically between the top plate portion 10 and the base portion 11.

Optical displacement sensors 18A, 18B are arranged in the vicinities of the corner portions of the front end portion of the base portion 11 (illustrated only in FIG. 5 by being simplified in a rectangular shape). The displacement sensor 18A of the left-hand side is aligned with an extension line of the axis of the motor $M_A$ of the right-hand side. The displacement sensor 18B of the right-hand side is aligned with an extension line of the axis of the motor $M_B$ of the left-hand side. The distances from the arrangement position of each of the displacement sensors 18A, 18B to the top plate portion 10 are measured by the displacement sensors 18A, 18B and the measurement value is inputted to the control device 100.

Although the illustration is omitted in FIGS. 2 to 7, the control device 100 is comprised of: a circuit board; and a case body for protecting the circuit board. The control device 100 is arranged at an appropriate position of the peripheral edge portion of the base portion 11 and connected to an external power source via a connector provided on an appropriate position of the lower member 22 of the cover body 2. Note that the control device 100 can be attached to an inner surface of the lower member 22.

Figure 8:
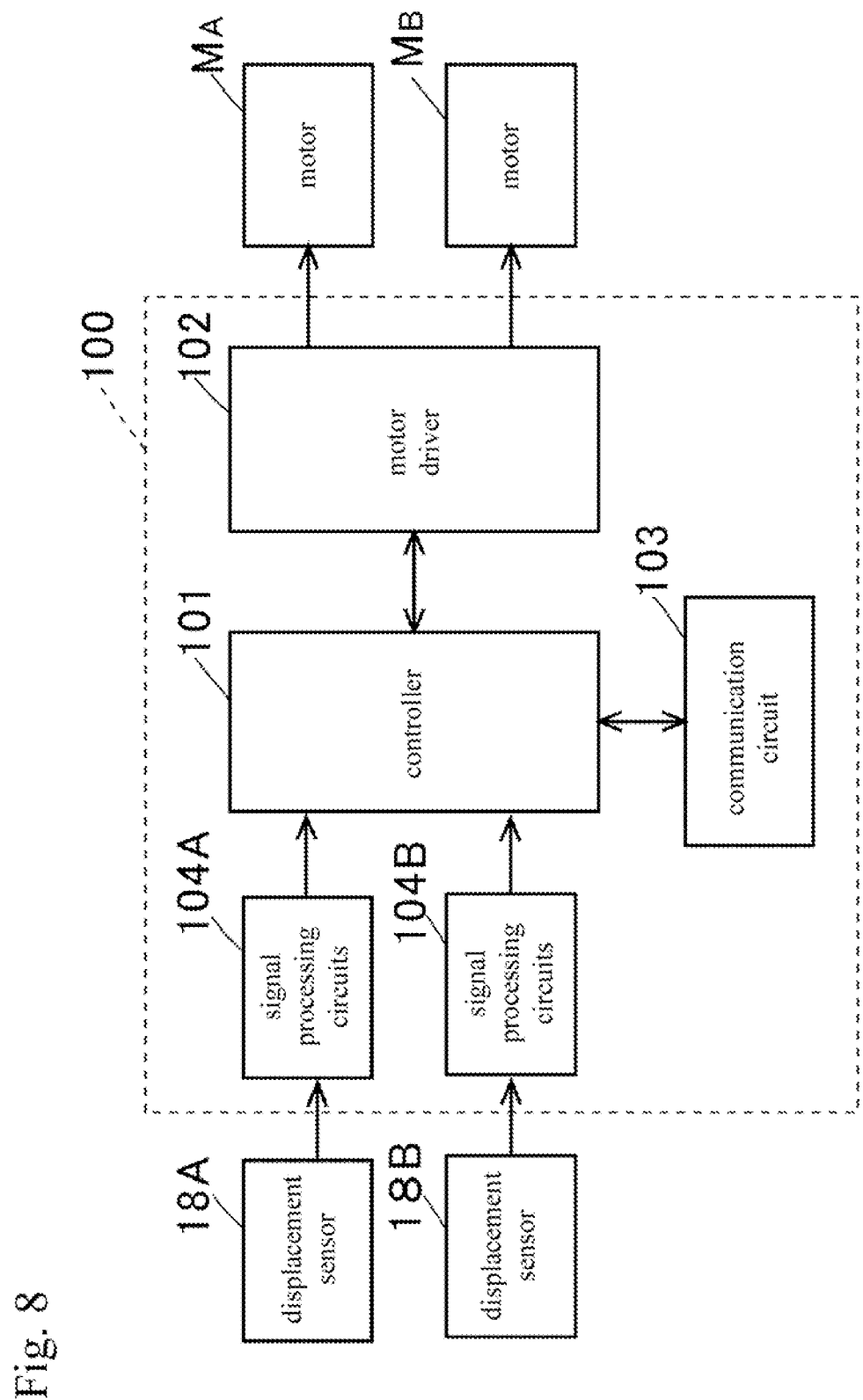
FIG. 8 is a block diagram showing an electrical configuration of the rocking device.

FIG. 8 is a block diagram showing an electrical configuration in the rocking device S including the above described control device 100. The control device 100 of the present embodiment includes a controller 101 achieved by a microcomputer, a motor driver 102, a communication circuit 103, signal processing circuits 104A, 104B of the displacement sensors 18A, 18B, and the like.

The controller 101 communicates with a game device (not illustrated) which executes application software for games via the communication circuit 103. When the controller 101 receives a command signal for tilting the top plate portion 10 (signal indicating the rotation angle and the rotation speed in the roll axis and the pitch axis) from the game device according to the progress of the game, the controller 101 replaces the command signal with the signal indicating the rotation position (target position to which the motors are rotated) and the rotation speed of the motors $M_A$, $M_B$ and outputs it to the motor driver 102. The motor driver 102 controls the rotation direction and the rotation amount of each of the motors $M_A$, $M_B$ according to the command signal outputted from the controller 101.

In the present embodiment, each of the motors $M_A$, $M_B$ is controlled to rotate so that the position of the connection portion between the plate cam 110 and the first arm 111 is moved within the range of half circumference of the width center side of the body portion 1. In other words, referring to FIG. 7 where the front surface of each of the motors $M_A$, $M_B$ is viewed from the front, the connection portion between the plate cam 110 and the first arm 111 is moved within the right half range (left half range when viewed from the front) in the entire circumference in the motor $M_A$ and the connection portion between the plate cam 110 and the first arm 111 is moved within the left half range (right half range when viewed from the front) in the motor $M_B$. Furthermore, in the present embodiment, in order to limit the range of actually moving the motors $M_A$, $M_B$ in the above described left or right half range, the following setting process is executed.

In the setting process, while the controller 101 repeatedly rotates each of the motors $M_A$, $M_B$ one by one in both forward and backward directions within the above described left or right half range, the controller 101 takes in the measurement values of the displacement sensors 18A, 18B located on the extension line of the axis of the rotating motors. Namely, when the motor $M_A$ located at the right side viewed from the front is rotated, the measurement value of the displacement sensor 18A located at the left side is obtained. When the motor $M_B$ located at the left side viewed from the front is rotated, the displacement sensor 18B located at the right side is obtained.

Furthermore, regarding the rotating motor $M_A$ (or $M_B$), the controller 101 identifies a rotation position where a preliminarily determined top most position (an upper limit position of the height of the front end portion of the top plate portion 10) is obtained and a rotation position where the measurement value showing a preliminarily determined bottom most position (a lower limit position of the front end portion of the top plate portion 10) is obtained, from the displacement sensor 18A (or 18B) which obtain the measurement value. Then, the controller 101 determines that the rotation range of the motor is between the above described positions. In addition, the center position (the position where the measurement value corresponding to the average value between the top most position and the bottom most position has been obtained) of the rotation range is set to the reference position of the motor.

As described above, based on the measurement values of the displacement sensors 18A, 18B, a rotation range required for displacing the top plate portion 10 within a preliminarily determined height range is identified for each of the motors $M_A$, $M_B$, and the motors $M_A$, $M_B$ is rotated within the identified range. Consequently, the influence caused by mechanical errors of the rocking mechanisms 15A, 15B can be reduced and the range of the inclination of the top plate portion 10 in the left-right direction can be uniformed. The target position for rotating the motors $M_A$, $M_B$ can be easily calculated for each of the motors $M_A$, $M_B$ from the ratio with respect to the range from the top most position to the bottom most position.

Note that the top most position and the bottom most position for determining the rotation range can be also determined by the method of preliminarily taking in measurement values of the displacement sensors 18A, 18B located on the extension lines of the axes of the motors $M_A$, $M_B$ while rotating the motors $M_A$, $M_B$ one by one and selecting two positions existed in the common area of the variation range of the measurement values of the two sensors.

The means for measuring the displacement of the top plate portion 10 caused by the rotation of the motors $M_A$, $M_B$ is not limited to the displacement sensors 18A, 18B. The displacement sensors 18A, 18B can be replaced with the measuring unit having the configuration shown in the schematic diagram of FIG. 9.

Figure 9:
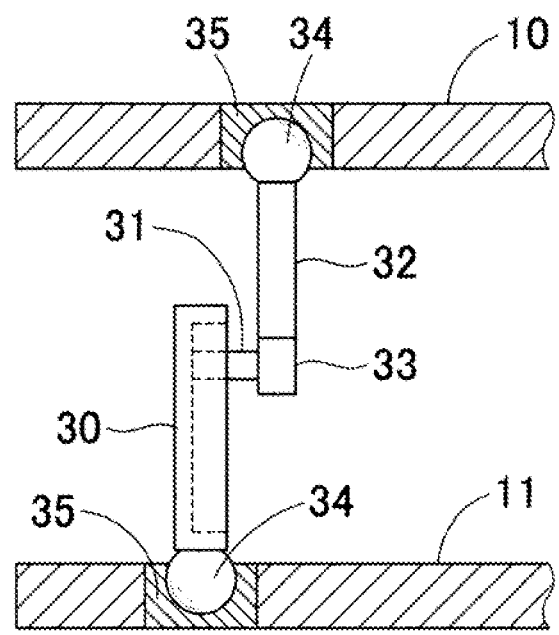
FIG. 9 is a schematic diagram showing a configuration of measuring units (measuring means) used instead of displacement sensors.

The measuring unit shown in FIG. 9 is comprised of: a linear potentiometer 30 vertically arranged on the base portion 11; a detection rod 32 extended in the vertical direction from the top plate portion 10; and a joint member 33 for connecting a tip end portion of the detection rod 32 with a slider 31 of the linear potentiometer 30. The linear potentiometer 30 and the detection rod 32 are supported by a ball joint 34 and a receiving (bearing) member 35 of the ball joint 34 which are provided on the thickness part of the base portion 11 and the top plate portion 10.

In the above described configuration, when the top plate portion 10 is moved upward or downward, the detection rod 32 and the slider 31 are moved in the same direction. A voltage signal indicating the position of the slider 31 at every time is inputted to the control device 100, converted into a digital value, and the converted value is used as an index showing the position of the top plate portion 10.

Same as the displacement sensors 18A, 18B, two measuring units shown in FIG. 9 are introduced and aligned with extension lines of the axes of the motors $M_A$, $M_B$ respectively. The controller 101 executes the setting process same as the above described explanation using the measurement values obtained by each of the measuring units.

When the rotation ranges of the motors $M_A$, $M_B$ are determined by the setting process, the controller 101 rotates each of the motors $M_A$, $M_B$ to the reference position and stopped it. Then, the controller 101 executes the control operation for moving the top plate portion 10 according to the command signals transmitted from the external game device in cooperation with the motor driver 102.

Figure 10A:
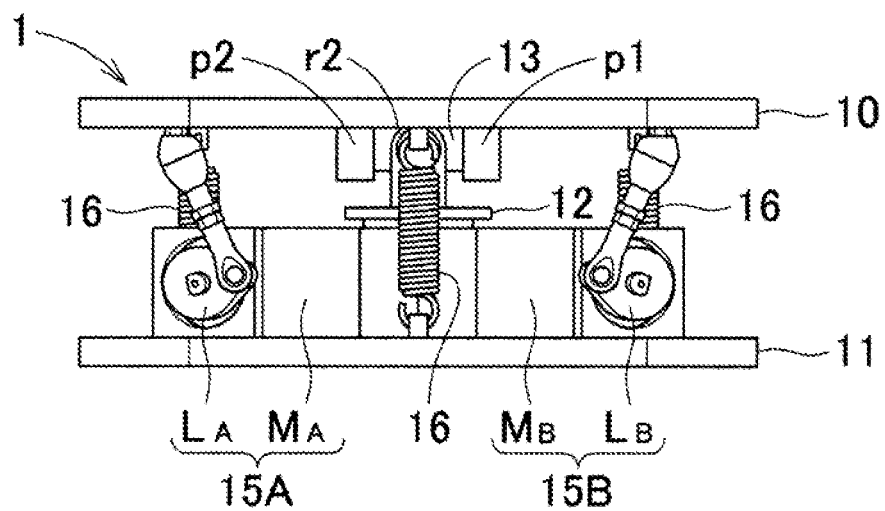
FIGS. 10A to 10C are diagrams showing change of the top plate portion and the link mechanisms when a top plate portion is rocked in a front-rear direction.
Figure 10B:
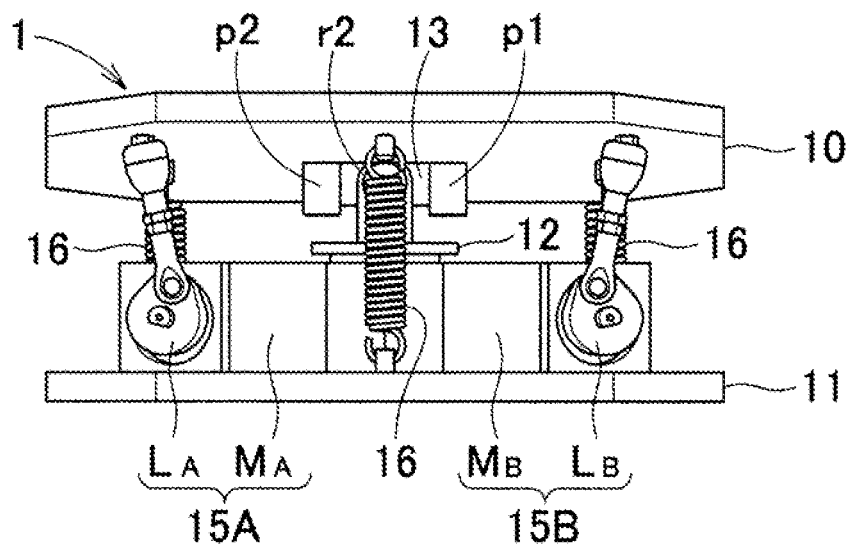
Figure 10C:
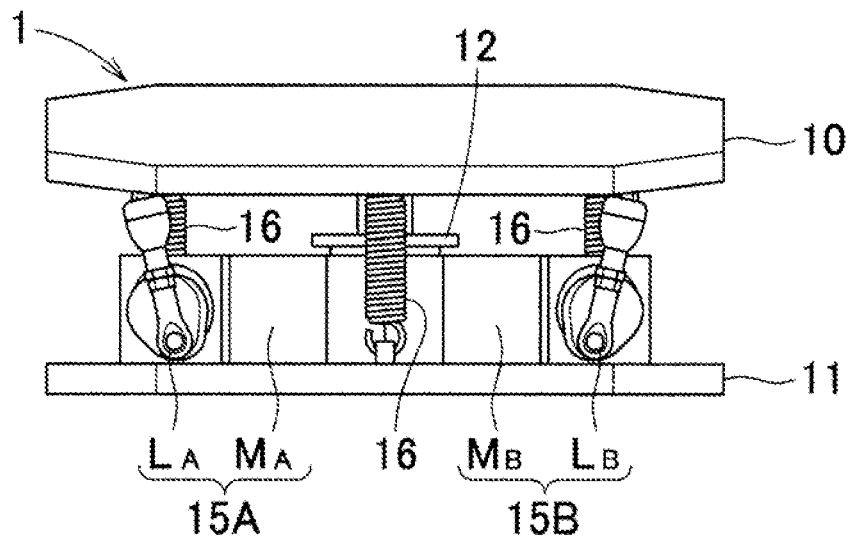

For example, when the top plate portion 10 is controlled to rock in the front-back direction (around the pitch axis between the support members p1, p2), the controller 101 makes the motors $M_A$, $M_B$ rotate in the direction opposite to each other. Thus, as shown in FIGS. 10A, 10B and 10C, the link mechanisms $L_A$, $L_B$ of the rocking mechanisms 15A, 15B are moved in the same direction. Namely, in order to tilt the top plate portion 10 to a forward tilting posture, both of the link mechanisms $L_A$, $L_B$ are moved upward (shown in FIG. 10B). In order to tilt the top plate portion 10 to a rearward tilting posture, both of the link mechanisms $L_A$, $L_B$ are moved downward (shown in FIG. 10C).

Figure 11A:
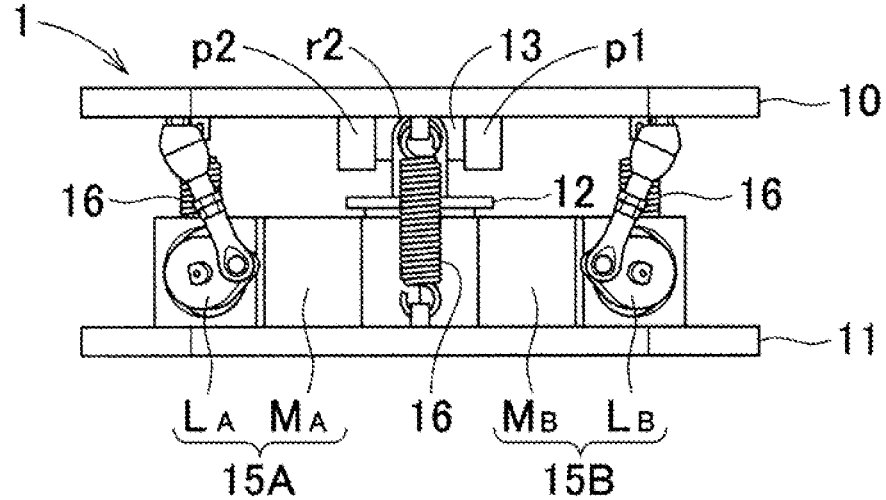
FIGS. 11A to 11C are diagrams showing change of the top plate portion and the link mechanisms when the top plate portion is rocked in a left-right direction.
Figure 11B:
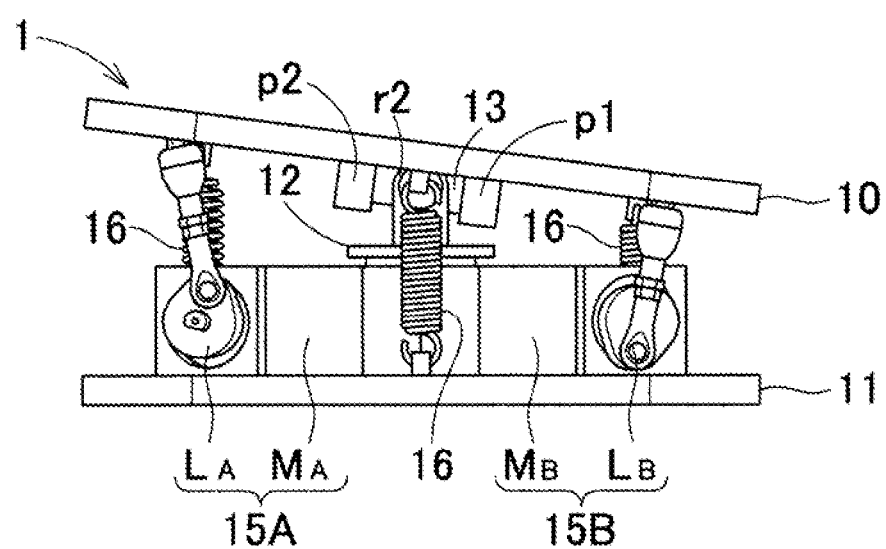
Figure 11C:
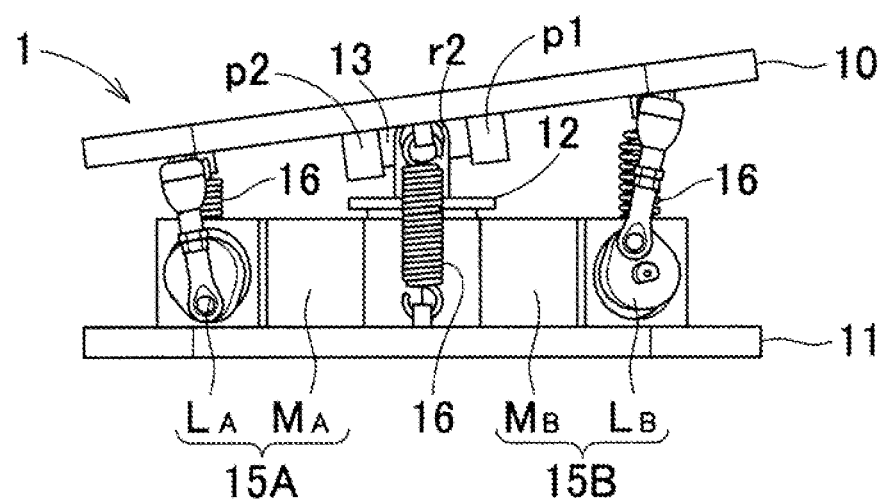

When the top plate portion 10 is controlled to rock in the left-right direction (around the roll axis between the support members r1, r2), the controller 101 makes the motors $M_A$, $M_B$ rotate in the same direction. Thus, as shown in FIGS. 11A, 11B and 11C, the link mechanisms $L_A$, $L_B$ of the rocking mechanisms 15A, 15B are moved in the direction opposite to each other so that the height of the link mechanisms $L_A$, $L_B$ is different from each other.

Based on the above described control operations as a base, various patterns of control operations can be performed. For example, the top plate portion 10 tilted by the rocking operation around the pitch axis in the forward tilting posture or the backward tilting posture can be also rocked around the roll axis. Otherwise, only one of the motors $M_A$, $M_B$ can be rotated to finely adjust the tilt of the top plate portion 10 in the left-right direction.

In the rocking device having the configuration shown in FIGS. 2 to 7, the link mechanisms $L_A$, $L_B$ which support the top plate portion 10 together with the strut member 12 located at the center are arranged near the left and right corner portions (notched portions) of the rear end portion of the top plate portion 10. Thus, the rear end portion of the top plate portion 10 can be stably supported during the rocking operation. In addition, since the link mechanisms $L_A$, $L_B$ are arranged with a sufficient interval from each other, the change of the inclination of the top plate portion 10 can be moderated with respect to the change of height difference of the link mechanisms $L_A$, $L_B$. Thus, the inclination of the top plate portion 10 can be finely adjusted.

Furthermore, since the rocking axis of the universal joint 13 is provided immediately below the top plate portion 10 and the top plate portion 10 is evenly supported by four tension springs 16 arranged so as to be spaced by a fixed distance in front, back, left and right from the strut member 12, the top plate portion 10 is prevented from unnecessarily rocked.

When the rotation direction of the motors $M_A$, $M_B$ is switched for changing the inclination of the top plate portion 10, the load of the motors $M_A$, $M_B$ can be reduced by the restoring force of the tension springs 16 extended below the position where the top plate portion 10 is moved upward. Since the tension springs 16 are arranged so as to be spaced by a fixed distance in front, back, left and right from the strut member 12, regardless of the inclination state of the top plate portion 10, the spring 16 located at the position where the top plate portion 10 is moved upward is biased (extended). Thus, when the rotation direction of the motors $M_A$, $M_B$ is switched to move the above described position downward, the load of the motors $M_A$, $M_B$ is reduced by the restoring force of the biased spring 16 and the rotation direction can be quickly switched.

In the present embodiment, since the posture of each of the motors $M_A$, $M_B$ is determined so that the axes of the two motors $M_A$, $M_B$ are inclined approximately 45 degrees with respect to the width center line, the four tension springs 16 can be arranged on the center lines along the front, rear, left and right directions of the body portion. However, the springs 16 can be arranged on the position slightly displaced from the center lines. In addition, the number of the springs 16 is not limited to four. For example, four springs 16 can be arranged respectively on two concentric circles formed around the strut member 12 (i.e., two springs 16 are arranged respectively on four directions).

It is not necessary to align the axes of the motors $M_A$, $M_B$ with the direction inclined approximately 45 degrees with respect to the width center line. The axial direction of the motors $M_A$, $M_B$ can be changed as long as the link mechanisms $L_A$, $L_B$ are located at the position near the left and right corner portions of the rear end portion.

Contrary to the above describe embodiment, it is also possible that the output shaft 115 of the motors $M_A$, $M_B$ of the rocking mechanisms 15A, 15B is directed frontward, the distance between the motors are increased as separating from the strut member 12, the motors are arranged in a front area compared to the strut member 12 of the supporting surface 11a of the base portion 11, and thus the link mechanisms $L_A$, $L_B$ are connected in the vicinities of the left and right corner portions (notched portions) of the front peripheral edge of the top plate portion 10. Even when the configuration is changed as described above, the degree of the rocking motion can be finely adjusted while the top plate portion 10 is supported by three positions of the center and the left and right corner portions of the front peripheral edge portion. In addition, since the tension springs 16 can be arranged on four positions similar to FIG. 5, the top plate portion 10 can be moderately rocked by the support of the tension springs 16.

When the rocking mechanisms 15A, 15B are arranged frontward than the strut member 12, the displacement measuring units such as the displacement sensors 18A, 18B can be provided on the positions located at the rear of the device corresponding to the extension lines of the axes of the motors $M_A$, $M_B$ and the rotation operation of the motors $M_A$, $M_B$ can be precisely controlled by the measurement values of the displacement measuring units.

The shapes of the top surface 10a of the top plate portion 10 and the supporting surface 11a of the base portion 11 are not limited to the shape of the above described embodiment. They can be a rectangular shape without notches, a circular shape or an elliptic shape. In addition, the supporting surface 11a of the base portion 11 can be specified to be slightly larger than the top surface 10a, and the shape of the supporting surface 11a can be different from the shape of the top surface 10a. Regardless of the shapes of the above described components and regardless of the arrangement of the rocking mechanisms 15A, 15B arranged frontward or rearward of the strut member 12, the motors $M_A$, $M_B$ of the rocking mechanisms 15A, 15B are arranged on the supporting surface 11a of the base portion 11 in a horizontal state while the axial direction of the motors $M_A$, $M_B$ are oblique to the width center of the base portion. Thus, the depth of the device can be shortened compared to the case where the axes of the motors $M_A$, $M_B$ are arranged in the front-rear direction so as to be in parallel with each other. In addition, different from the device of Patent document 1, the height of the device is not high. Thus, flexibility can be secured about the space of installing the rocking device S.

Figure 12:
FIG. 12 is a diagram showing a usage example of the rocking device.
Figure 13:
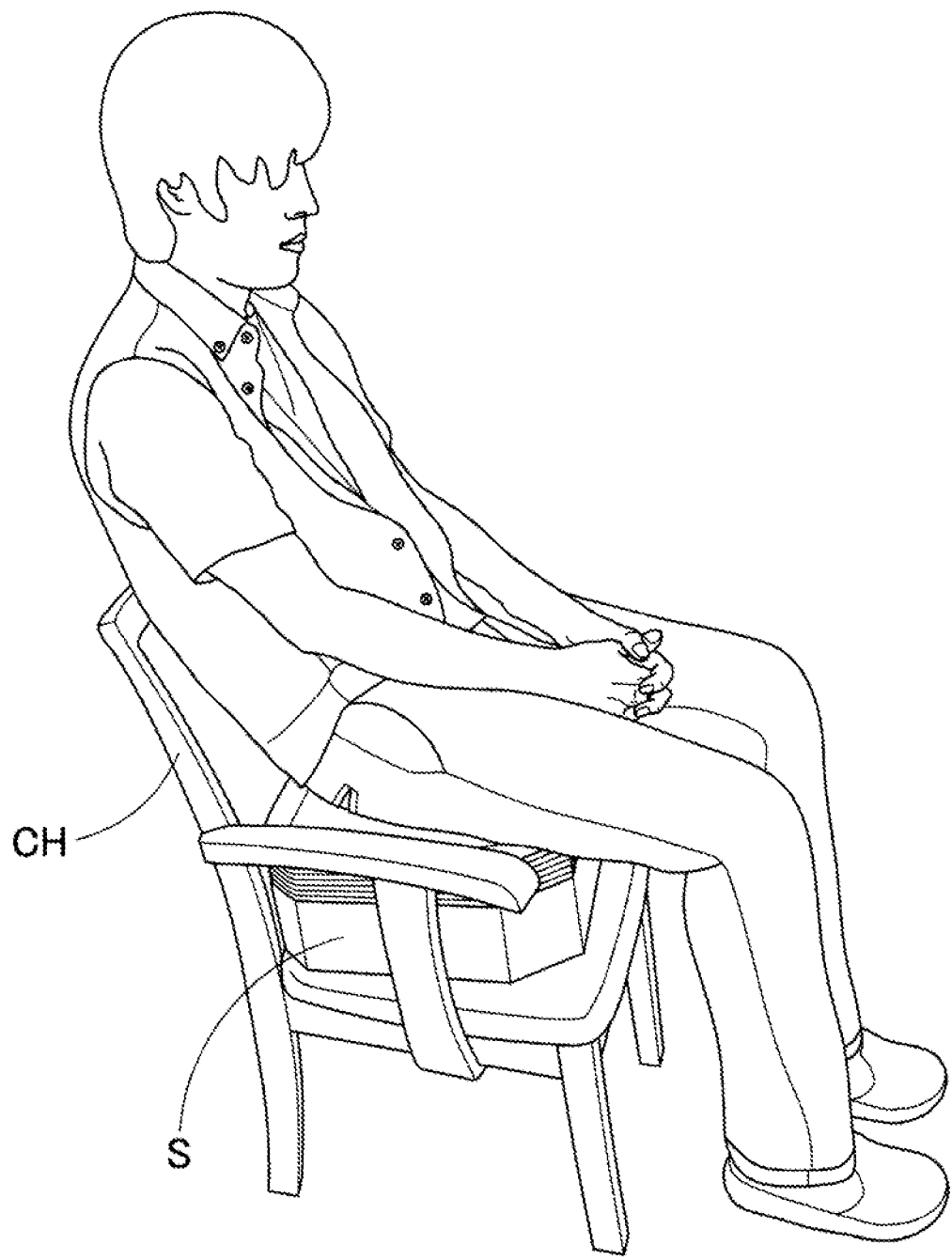
FIG. 13 is a diagram showing another usage example of the rocking device.

For example, as shown in FIG. 12, it is possible to place the rocking device S on the floor and sit on the rocking device S. In addition, as shown in FIG. 13, it is possible to place the rocking device S on a seat surface of a chair CH and sit on the rocking device S. The rocking device S can be also used on a sofa and on a mattress as long as the whole bottom surface of the base portion 11 can be stably supported in a horizontal state.

If the whole bottom surface of the base portion 11 is supported in a horizontal state, the top plate portion 10 and the seat portion formed by the cushion 20 and the upper member 21 arranged on the top plate portion 10 can be rocked sufficiently. Thus, the user seated on them can feel the change of the posture sufficiently. However, in order to prevent the body of the user from slipping off from the seat portion, it is required to urge the user to sit on the seat portion while the center of gravity of the body of the user is displaced rearward. From the above described viewpoint, it is possible to adapt the structure of detachably attaching a backrest on the cover body 2 located at the surface. When the device is used at the position where there is no substitute of the backrest as shown in the example of FIG. 12, the device can be used in a state that the backrest is attached.

DESCRIPTION OF THE REFERENCE NUMERALS

S: rocking device
1: body portion
2: cover body
10: top plate portion
10a: top surface
11: base portion
11a: supporting surface
12: strut member
12a: strut body
13: universal joint
15A, 15B: rocking mechanism
16: tension spring
18A, 18B: displacement sensor
20: cushion
21: upper member
22: lower member
23: intermediate member
30: linear potentiometer
32: detection rod
100: control device
101: controller
102: motor driver
110: plate cam
111: first arm
112: second arm
115: output shaft
$M_A$, $M_B$: motor
$L_A$, $L_B$: link mechanism

The invention claimed is:

1. A seat-type rocking device, comprising:
a top plate portion for supporting a seat portion;
a base portion having a supporting surface which faces the top plate portion;
a strut member which is connected to the center of the base portion and the center of the top plate portion so that the strut member rockably supports the top plate portion;
a pair of rocking mechanisms for rocking the top plate portion, wherein
each of the pair of rocking mechanisms includes:
a motor which is rotatable in both forward and reverse directions; and
a link mechanism which is arranged between an output shaft of the motor and the top plate portion, connected to both of the output shaft and the top plate portion, and configured to be vertically displaced in accordance with a rotation of the motor,
the motor of each of the pair of rocking mechanisms is arranged in a front area or a rear area compared to the strut member in the supporting surface of the base portion so that a connection portion between the motor and the link mechanism is directed toward a peripheral edge of the base portion,
the axial direction of the motor of one of the pair of rocking mechanisms is aligned with a direction inclined leftward with respect to a width center line of the supporting surface,
the axial direction of the motor of the other of the pair of rocking mechanisms is aligned with a direction inclined rightward with respect to the width center line of the supporting surface, and
the top plate portion and the base portion are connected with each other via an elastic member at each of four positions located at front, rear, left and right of the strut member respectively.

2. The seat-type rocking device according to claim 1, wherein
the motor of each of the pair of rocking mechanisms is arranged so that the axial direction of the motor is aligned with a direction inclined approximately 45 degrees with respect to a width center line of the supporting surface.

3. The seat-type rocking device according to claim 1, wherein
each of the pair of rocking mechanisms further includes a measuring unit which is aligned with an extension line of an axis of the motor in the rear area or the front area where the motor is not arranged,
the measuring unit measures displacement of the top plate portion caused by the rotation of the motor corresponding to the measuring unit, and
the seat-type rocking device further includes a control device which determines a rotation range of the motor and rotates the motor within the rotation range so that a measurement value measured by the measuring unit meets within a predetermined range.

* * * * *